(12) United States Patent
Budde et al.

(10) Patent No.: US 8,674,560 B2
(45) Date of Patent: Mar. 18, 2014

(54) LINEAR DRIVE MODULE FOR A ROTARY/LINEAR DRIVE

(75) Inventors: Thomas Budde, Würzburg (DE); Aziz Inalkac, Neukirchen-Vluyn (DE); Mykhaylo Toldonov, Bamberg (DE); Rolf Vollmer, Gersfeld (DE)

(73) Assignee: Siemens Aktiengesellschaft, München (DE)

( * ) Notice: Subject to any disclaimer, the term of this patent is extended or adjusted under 35 U.S.C. 154(b) by 435 days.

(21) Appl. No.: 12/599,140

(22) PCT Filed: May 5, 2008

(86) PCT No.: PCT/EP2008/055466
§ 371 (c)(1),
(2), (4) Date: Sep. 22, 2010

(87) PCT Pub. No.: WO2008/135543
PCT Pub. Date: Nov. 13, 2008

(65) Prior Publication Data
US 2011/0006617 A1    Jan. 13, 2011

(30) Foreign Application Priority Data
May 7, 2007  (DE) .................. 10 2007 021 322

(51) Int. Cl.
*H02K 41/02*   (2006.01)
*H02K 7/20*    (2006.01)

(52) U.S. Cl.
USPC ...................................... 310/12.14; 74/89.31

(58) Field of Classification Search
USPC ...................................... 310/12.14; 74/89.31
See application file for complete search history.

(56) References Cited

U.S. PATENT DOCUMENTS

| 2,905,011 | A | * | 9/1959 | Armstrong et al. | .......... 74/89.33 |
| 3,169,407 | A | * | 2/1965 | Newell | .......... 74/424.9 |
| 3,405,569 | A | * | 10/1968 | Wroble | .......... 74/527 |

(Continued)

FOREIGN PATENT DOCUMENTS

| DE | 10324601 A1 | * | 12/2004 | .......... H02K 41/00 |
| EP | 0 875 982 A1 | | 11/1998 | |

(Continued)

OTHER PUBLICATIONS

Translation of foreign document EP 875982 A1.*

(Continued)

*Primary Examiner* — Tran Nguyen
*Assistant Examiner* — Alex W Mok
(74) *Attorney, Agent, or Firm* — Henry M Feiereisen LLC

(57) ABSTRACT

The aim of the invention is to provide a cost-effective, easily regulated rotary-linear drive. Therefore, the invention provides for the rotary-linear drive to connect a rotary drive (10) to a linear drive module (11). The linear drive module (11) comprises a rotatable drive-side receiving device for receiving a torque from the rotary drive (10). Additionally, the linear drive module has a linear motor, the armature (15) of which is rotatable, is rotated by a stator (14), and comprises an output element for the purpose of driving the shaft (12) in a rotary-linear fashion. To this end, the linear drive module (11) also comprises a coupling device (16) that couples the receiving device and the armature (15) in a rotationally secure but not linear fashion.

10 Claims, 5 Drawing Sheets

(56) References Cited

U.S. PATENT DOCUMENTS

| | | | |
|---|---|---|---|
| 3,530,734 A * | 9/1970 | Wray et al. | 74/89.3 |
| 4,512,208 A * | 4/1985 | Lipinski et al. | 74/89.4 |
| 4,614,128 A * | 9/1986 | Fickler | 74/89.31 |
| 5,051,635 A | 9/1991 | Kasahara | |
| 5,677,582 A * | 10/1997 | Lutz et al. | 310/75 R |
| 6,204,585 B1 * | 3/2001 | Riello et al. | 310/159 |
| 6,362,547 B1 | 3/2002 | Peterson | |
| 6,433,447 B1 | 8/2002 | Kitazawa | |
| 7,285,883 B2 * | 10/2007 | Bott et al. | 310/75 R |
| 2001/0023855 A1 * | 9/2001 | Daugherty, Jr. | 213/62 R |
| 2004/0261553 A1 * | 12/2004 | Bott et al. | 74/25 |
| 2008/0284256 A1 * | 11/2008 | Budde et al. | 310/12 |
| 2009/0302832 A1 * | 12/2009 | Budde et al. | 324/207.24 |

FOREIGN PATENT DOCUMENTS

| | | |
|---|---|---|
| WO | WO 2006056546 A2 * | 6/2006 |
| WO | WO 2006056548 A2 * | 6/2006 |
| WO | WO 2006056551 A1 * | 6/2006 |

OTHER PUBLICATIONS

Do Quoc Chinh; Elektromechanische Antriebselemente zur Erzeugung kombinierter Dreh-Schub-Bewegungen für die Gerätetechnik; Dissertation, TU Dresden, Fakultät Elektrotechnik, 1987, Seiten 31 bis 33; Dresden; Others; 1987.

* cited by examiner

LINEAR DRIVE MODULE FOR A ROTARY/LINEAR DRIVE

CROSS-REFERENCES TO RELATED APPLICATIONS

This application is the U.S. National Stage of International Application No. PCT /EP2008/055466, filed May 5, 2008, which designated the United States and has been published as International Publication No. WO 2008/135543 and which claims the priority of German Patent Application, Serial No. 10 2007 021 322.2, filed May 7, 2007, pursuant to 35 U.S.C. 119(a)-(d).

BACKGROUND OF THE INVENTION

The present invention relates to a linear drive module to be built onto a rotary drive, so that a rotary/linear movement of a shaft can be generated. Furthermore, the present invention relates to a rotary/linear drive with a linear drive module of this type.

For a drive, in particular for lift-and-pivot drives in the handling sector, for example for grabs (pick and place), or similar applications, it is necessary to execute a rotary and a linear movement on the output shaft. These movements must be capable of being generated independently of one another, but also so as to be superposed.

A rotary and linear movement of an output shaft has hitherto been implemented using a lift-and-pivot gear and two standard motors. One example of such a drive is illustrated in FIG. 1. A lift-and-pivot gear 1 is driven, on the one hand, by a servomotor 2 for the lift axis and, on the other hand, by a servomotor 3 for the axis of rotation. One of the two servomotors therefore serves for generating the rotary movement and the other for generating the linear movement. On using the gear 1, the combined rotary/linear movement can then be generated, which the output shaft 4 executes. A drive according to the form of construction of FIG. 1 is known, for example, from the company Schwaben Prazision. The disadvantage of this form of construction, however, is the relatively costly lift-and-pivot gear 1.

The dissertation by Do Quoc Chinh, "Elektromechanische Antriebselemente zur Erzeugung kombinierter Dreh- und SchubBewegungen für die Gerätetechnik" ["Electromechanical drive elements for generating combined rotary and translational movements for technical equipment"], TU Dresden, Faculty of Electrotechnics, 1987, pages 31 to 33, discloses combinations of drive units. Here, the object is to couple two separate drive elements for rotary and translational movements to one another by means of mechanical elements. Such couplings mostly have to satisfy very stringent requirements with regard to high dynamics, good movement transmission and high reliability. Rectilinear sliding joints, clutches or gearwheel mechanisms can be used as coupling elements. In concrete terms, for example, a series arrangement and a parallel arrangement, each with a translational and rotary drive fixed to the frame, are presented.

SUMMARY OF THE INVENTION

The object of the present invention is, therefore, to generate a rotary/linear movement with high precision by means of a more favorable drive.

This object is achieved, according to the invention, by means of a linear drive module to be built onto a rotary drive, so that a rotary/linear movement of a shaft can be generated, with a drive-side rotatable reception device for receiving a torque from a drive shaft of the rotary drive and for releasable rotationally fixed connection to the drive shaft, with a linear motor, the rotor of which is movable in rotation, is moved linearly by a stator and has an output element in order to drive the shaft in a rotary/linear manner, and with a coupling device which couples the reception device and the rotor to one another fixedly in terms of rotation, but not linearly.

It is therefore advantageously possible to make a combination drive of modular type of construction available. By means of the linear motor of the linear drive module, on the one hand, a highly precise linear movement can be generated, and, on the other hand, the costly lift-and-pivot gear can consequently be dispensed with. As before, however, a standard servomotor can be used for the rotary drive.

Preferably, the coupling device of the linear drive module according to the invention possesses a torque-transmitting spherical liner. By means of this, it is possible for the torque of a rotary drive to be fed, virtually free of loss, to an output shaft independently of the linear movement of the latter.

The coupling device may be formed in one part with the reception device. In particular, the torque-transmitting spherical liner may serve as a reception device, so that further reception mechanisms can be dispensed with.

Furthermore, the linear drive module according to the invention may have a position encoder and a specific converter, regulated thereby, for the linear motor. The linear drive can consequently be regulated completely independently of the rotary drive.

It is advantageous, moreover, if the linear drive module has as an output element an output shaft which is connected rigidly to the rotor of the linear motor, a rotation-invariant position encoder being arranged on the output shaft. This makes it possible for the drive to have very high linear positioning accuracy.

As already indicated above, by means of the linear drive module a rotary/linear drive can be set up particularly advantageously, in that a rotary drive is built onto the linear drive module. In this case, the coupling of the rotary drive to the linear drive module may take place directly. This results in a highly compact and low-loss rotary/linear drive.

According to an alternative embodiment, however, the rotary drive and the linear drive module may also be coupled to one another via a gear or a toothed belt. The torque and rotational speed of the rotary drive can consequently be set in a desired way.

According to a further form of construction, the rotary drive and the linear drive module may be arranged next to one another, so that their axes run parallel to one another. An axially short rotary/linear drive can thereby be implemented.

BRIEF DESCRIPTION OF THE DRAWING

The present invention is explained in more detail by means of the accompanying drawings in which.

DETAILED DESCRIPTION OF PREFERRED EMBODIMENTS

The embodiments outlined in more detail below constitute preferred exemplary embodiments of the present invention.

Figure 1:
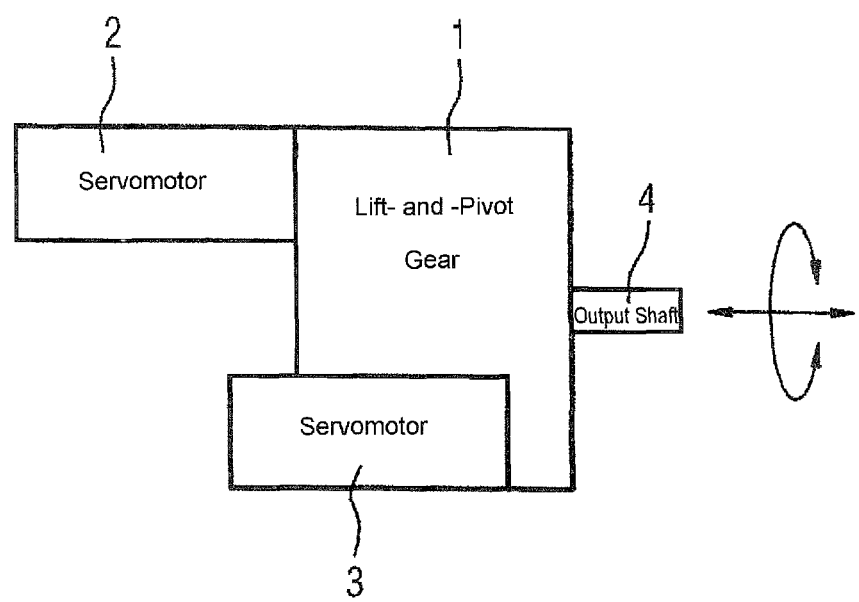
FIG. 1 shows a lift-and-pivot drive according to the prior art.
Figure 2:
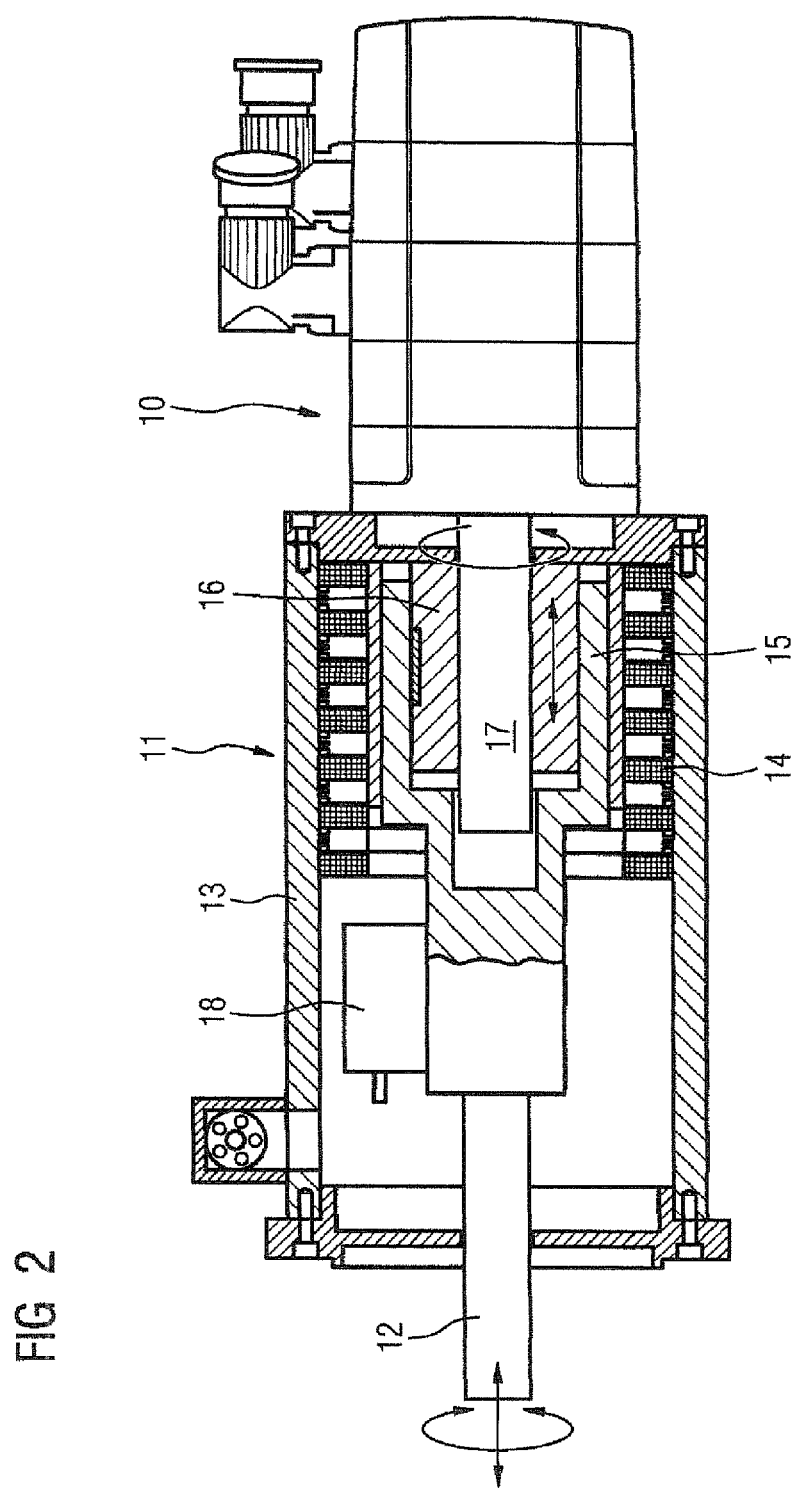
FIG. 2 shows a longitudinal section through a rotary/linear drive according to the invention with a built-on linear module.

The example reproduced in FIG. 2 shows a rotary/linear drive with a rotary drive 10 and with a built-on linear module 11. The two are coupled to one another coaxially. The rotary drive 10 may be constructed from a standard servomotor or a standard geared servomotor. In any event, a superposed rotary and linear movement executable independently of one another can thus be transmitted to an output shaft 12.

The built-on linear module 11 consists essentially of a linear motor which is accommodated in a housing 13. The linear motor possesses a stator 14 and also a rotationally movable rotor 15. The rotor 15 is here of approximately pot-shaped design and has inside it a torque-transmitting spherical liner 16. The latter is connected to the rotor 15 fixedly, in particular fixedly in terms of rotation.

Figure 7:
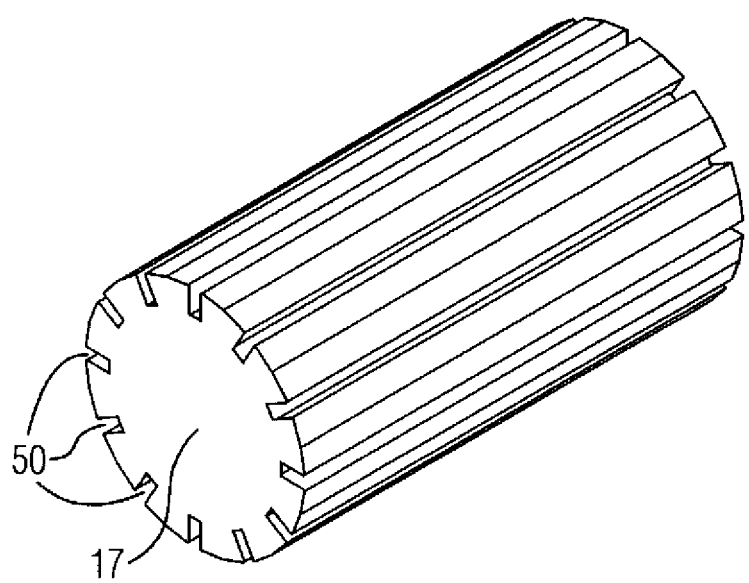
FIG. 7 shows a perspective view of the shaft of a rotary/linear drive according to the invention with longitudinal grooves.

The shaft 17 of the rotary drive 10 runs inside the torque-transmitting spherical liner 16. This shaft 17 is connected fixedly in terms of rotation to the torque-transmitting spherical liner 16. The shaft 17 therefore has corresponding longitudinal grooves 50 as best illustrated in FIG. 7. Since the torque-transmitting spherical liner 16 ensures only a rotationally fixed connection between the shaft 17 and rotor 15, the rotor 15 is decoupled in terms of its linear movement from the shaft 17.

The built-on linear module 11 thus serves for superposing the linear movement and the rotary movement, so that a rotary/linear movement can be picked off at the end of the output shaft 12. When the rotational movement of the rotary motor 10 is being transmitted to the output shaft 12, therefore, the torque-transmitting spherical liner 16 affords a degree of linear freedom, so that the linear motor can position the output shaft 12 of the built-on linear module 11 linearly, as desired, and at the same time can transmit the rotational movement in any desired linear position.

In the present example, the rotor 15 of the linear motor is connected rigidly to the output shaft 12. Moreover, a rotation-invariant linear position encoder 18 is arranged at the end of the output shaft 12 of the built-on linear module 11. High linear positioning accuracy can thereby be achieved.

Furthermore, with regard to the regulatability of the drive, it is advantageous if both the rotary motor and the linear motor have in each case a specific position encoder 21 and a separate converter 22. Moreover, it may be necessary for the built-on linear module 11 and/or the rotary drive 10 to be provided with a temperature sensor system.

Figure 3:
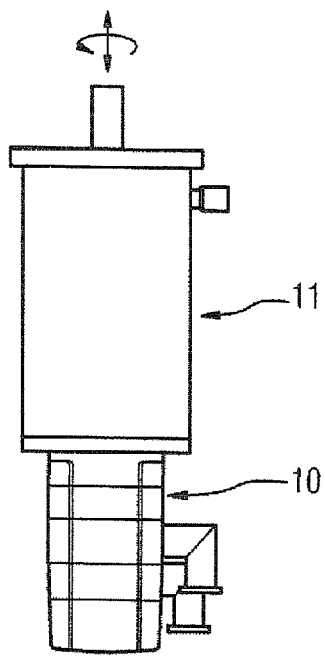
FIG. 3 shows the rotary/linear drive of FIG. 2 with an outside view.
Figure 4:
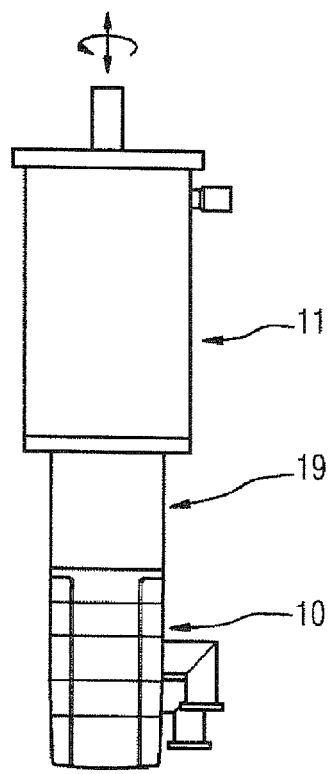
FIG. 4 shows an alternative embodiment of a rotary/linear drive according to the invention with a gear.
Figure 5:
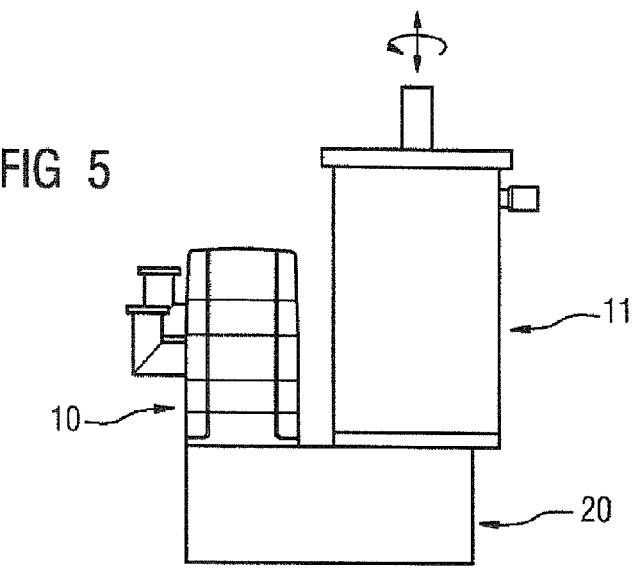
FIG. 5 shows a further embodiment of a rotary/linear drive according to the invention with a gear.
Figure 6:
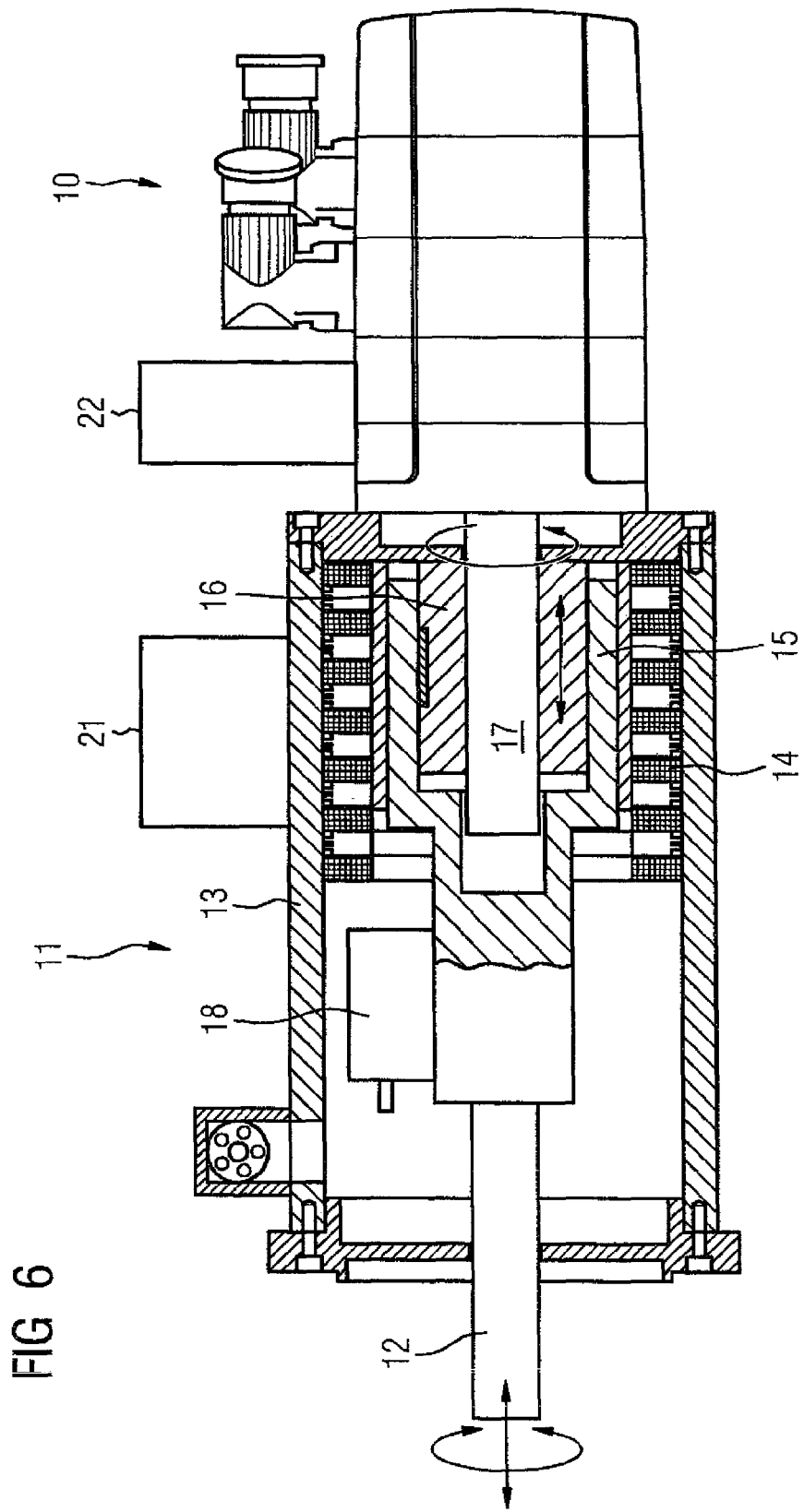
FIG. 6 shows a longitudinal section through the rotary/linear drive of FIG. 1 with depiction of an encoder-controlled converter.

FIGS. 3 to 5 illustrate different exemplary embodiments of the rotary/linear drive according to the invention. These different embodiments can easily be implemented since the combination drive possesses a modular set-up. A standard (geared) servomotor can therefore be combined with a built-on linear module according to the invention.

FIG. 3 shows the variant of a rotary/linear drive with a direct rotary drive, as in the example of FIG. 2, but in an outside view. The rotary servomotor 10 is therefore coupled directly to the built-on linear module 11 here. This leads to a compact low-loss drive.

According to the example from FIG. 4, the built-on linear module 11 may also be coupled to the rotary servomotor 10 via a gear 19. The gear 19 ensures the desired rotational speed or the desired torque which is also available at the output shaft 12 of the built-on linear module 11.

According to the exemplary embodiment of FIG. 5, the rotary servomotor 10 and the built-on linear module 11 are not connected linearly in series, but are arranged next to one another in parallel, so that their axes of rotation run parallel to one another. The overall drive then acquires, for example, a U-shape, the connecting leg being formed by a gear or a toothed belt arrangement 20. The combination drive can thereby have an axially very short design.

Thus, by virtue of the built-on linear module according to the invention, a cost-intensive drive combination of standard motors and of a separate gear, which is conventionally used to convert the rotary drive movement into a combined linear/rotary advancing movement, can be dispensed with. This leads to a cost saving for the overall drive. Furthermore, the drive system can be regulated substantially more simply, and mechanical components subject to wear are replaced by wear-free components, with the result that a longer service life of the drive is achieved.

What is claimed is:

1. A linear drive module, comprising:
    a drive-side rotatable reception device receiving a torque from a drive shaft of a rotary drive and releasably connected in fixed rotative engagement to the drive shaft so as to allow attachment of the linear drive module to the rotary drive in a modular set-up;
    a linear motor having a stator and a rotor which is movable for rotation, said rotor being moved linearly by the stator and having an output element to drive an output shaft in a rotary/linear manner; and
    a coupling device received inside the rotor, said coupling device connected to the drive shaft via longitudinal grooves, which are formed on the drive shaft, and coupling the reception device and the rotor in fixed rotative engagement, thereby allowing a movement of the rotor in linear direction.

2. The linear drive module of claim 1, wherein the coupling device includes a torque-transmitting spherical liner.

3. The linear drive module of claim 1, wherein the coupling device is formed in one part with the reception device.

4. The linear drive module of claim 1, further comprising a position encoder having an encoder-controlled converter for the linear motor.

5. The linear drive module of claim 1, wherein the output element is connected rigidly to the rotor of the linear motor, and further comprising a rotation-invariant position encoder arranged on the output shaft.

6. A modular rotary/linear drive, comprising:
    a rotary drive having a rotatable drive shaft provided with longitudinal grooves; and
    a linear drive module attached on the rotary drive and having a drive-side rotatable reception device receiving a torque from the drive shaft of the rotary drive and releasably connected in fixed rotative engagement to the drive shaft, a linear motor having a stator and a rotor which is movable for rotation, with the rotor being moved linearly by the stator and having an output element to drive an output shaft in a rotary/linear manner, and a coupling device received inside the rotor, said coupling device connected to the drive shaft via the longitudinal grooves and coupling the reception device and the rotor in fixed rotative engagement, thereby allowing a movement of the rotor in linear direction.

7. The rotary/linear drive of claim 6, wherein the rotary drive and the linear drive module are directly coupled to one another.

8. The rotary/linear drive of claim 6, further comprising a gear to couple the rotary drive and the linear drive module to one another.

9. The rotary/linear drive of claim 6, further comprising a toothed belt to couple the rotary drive and the linear drive module to one another.

10. The rotary/linear drive of claim 6, wherein the rotary drive and the linear drive module are arranged in side-by-side relationship so that their axes extend parallel to one another.

* * * * *